United States Patent
Cai et al.

(10) Patent No.: US 9,785,499 B2
(45) Date of Patent: Oct. 10, 2017

(54) HOT-READ DATA AGGREGATION AND CODE SELECTION

(71) Applicant: Seagate Technology LLC, Cupertino, CA (US)

(72) Inventors: Yu Cai, San Jose, CA (US); Yunxiang Wu, Cupertino, CA (US); Erich F. Haratsch, San Jose, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 50 days.

(21) Appl. No.: 14/192,110

(22) Filed: Feb. 27, 2014

(65) Prior Publication Data

US 2015/0227418 A1 Aug. 13, 2015

Related U.S. Application Data

(60) Provisional application No. 61/938,936, filed on Feb. 12, 2014.

(51) Int. Cl.
G06F 11/10 (2006.01)
G06F 3/06 (2006.01)

(52) U.S. Cl.
CPC ...... *G06F 11/1048* (2013.01); *G06F 11/1016* (2013.01); *G06F 3/0616* (2013.01)

(58) Field of Classification Search
CPC ............ G06F 11/1016; G06F 11/1048; G06F 3/0616; G06F 11/34; G06F 12/0246; G06F 12/1009; G06F 17/30; G06F 3/0644; G06F 3/0658; G06F 3/0679; G06F 2212/1036; G06F 2212/2022; G06F 2212/652; G06F 2212/7202; G06F 2212/7211; G11C 11/5628; G11C 16/10; G11C 16/16; G11C 16/26; Y02B 60/1225
See application file for complete search history.

(56) References Cited

U.S. PATENT DOCUMENTS

| | | | |
|---|---|---|---|
| 8,578,244 B2 | 11/2013 | Roohparvar et al. | 714/768 |
| 2008/0005475 A1* | 1/2008 | Lubbers et al. | 711/118 |
| 2011/0225347 A1* | 9/2011 | Goss et al. | 711/103 |
| 2012/0284587 A1* | 11/2012 | Yu | G06F 3/0608 714/773 |
| 2013/0132652 A1* | 5/2013 | Wood | G06F 12/0246 711/103 |
| 2013/0282962 A1 | 10/2013 | Rub et al. | 711/103 |
| 2013/0314993 A1 | 11/2013 | Roohparvar | 365/185.09 |
| 2013/0326115 A1 | 12/2013 | Goss et al. | 711/103 |
| 2013/0326116 A1 | 12/2013 | Goss et al. | 711/103 |
| 2013/0326296 A1 | 12/2013 | Choi et al. | 714/721 |

(Continued)

*Primary Examiner* — Albert Decady
*Assistant Examiner* — Kyle Vallecillo
(74) *Attorney, Agent, or Firm* — Christopher P. Maiorana, PC (57) ABSTRACT

An apparatus comprising a memory and a controller. The memory is configured to process a plurality of read/write operations. The memory comprises a plurality of memory modules. Each memory module has a size less than a total size of the memory. The controller is configured to (i) classify data from multiple blocks of the memory as hot-read data or non hot-read data, (ii) aggregate the hot-read data to dedicated blocks, and (iii) select a type of error correcting code to protect the hot-read data in the dedicated blocks. The aggregation reduces an impact on endurance of the memory.

20 Claims, 6 Drawing Sheets

(56) References Cited

U.S. PATENT DOCUMENTS

| | | | |
|---|---|---|---|
| 2013/0346805 A1 | 12/2013 | Sprouse et al. | 714/42 |
| 2014/0019680 A1 | 1/2014 | Jin et al. | 711/112 |
| 2014/0040664 A1 | 2/2014 | Hida et al. | 714/15 |
| 2014/0040683 A1 | 2/2014 | Roohparvar et al. | 714/704 |
| 2014/0047302 A1 | 2/2014 | Guo et al. | 714/773 |
| 2014/0219001 A1* | 8/2014 | Patapoutian et al. | 365/148 |
| 2014/0325311 A1* | 10/2014 | Lo | G06F 11/1048 714/764 |
| 2016/0196076 A1* | 7/2016 | Oh | G06F 12/0246 711/103 |

* cited by examiner

HOT-READ DATA AGGREGATION AND CODE SELECTION

This application relates to U.S. Provisional Application No. 61/938,936, filed Feb. 12, 2014, which is hereby incorporated by reference in its entirety.

FIELD OF THE INVENTION

The invention relates to data storage generally and, more particularly, to a method and/or apparatus for implementing a hot-read data aggregation and code selection.

BACKGROUND

Read operations performed on data stored in a flash memory may disturb other data that share the same memory block that are not being read. Repeated read operations on data can cause other data to accumulate read disturb errors. Errors due to read disturb on stored data will cause frequent data recycling and increase system cost. Errors due to read disturb may also cause read disturb amplification. For example, if only one page of data in a memory block is read frequently the other pages inside the same block may be significantly disturbed and have to be recycled. Hot-read data is the data that are read multiple times (thousands and even millions of times). Traditionally, hot-read data is stored in the same memory block with other data. Read disturbs may reduce the endurance of flash memory. It would be desirable to reduce the number of read disturbs in flash memory.

SUMMARY

The invention concerns an apparatus comprising a memory and a controller. The memory is configured to process a plurality of read/write operations. The memory comprises a plurality of memory modules. Each memory module has a size less than a total size of the memory. The controller is configured to (i) classify data from multiple blocks of the memory as hot-read data or non hot-read data, (ii) aggregate the hot-read data to dedicated blocks, and (iii) select a type of error correcting code to protect the hot-read data in the dedicated blocks. The aggregation reduces an impact on endurance of the memory.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the invention include providing a hot-read data aggregation and code selection that may (i) reduce the amount of read disturb interference on flash memory, (ii) aggregate hot-read data to dedicated hot blocks, (iii) provide stronger ECC for aggregated hot-read data, (iv) be implemented during garbage collection, (v) be implemented during data recycling, (vi) be implemented during an idle state (vii) provide high reading throughput, (viii) provide read disturb correction, and/or (ix) be implemented as one or more integrated circuits.

Figure 1:
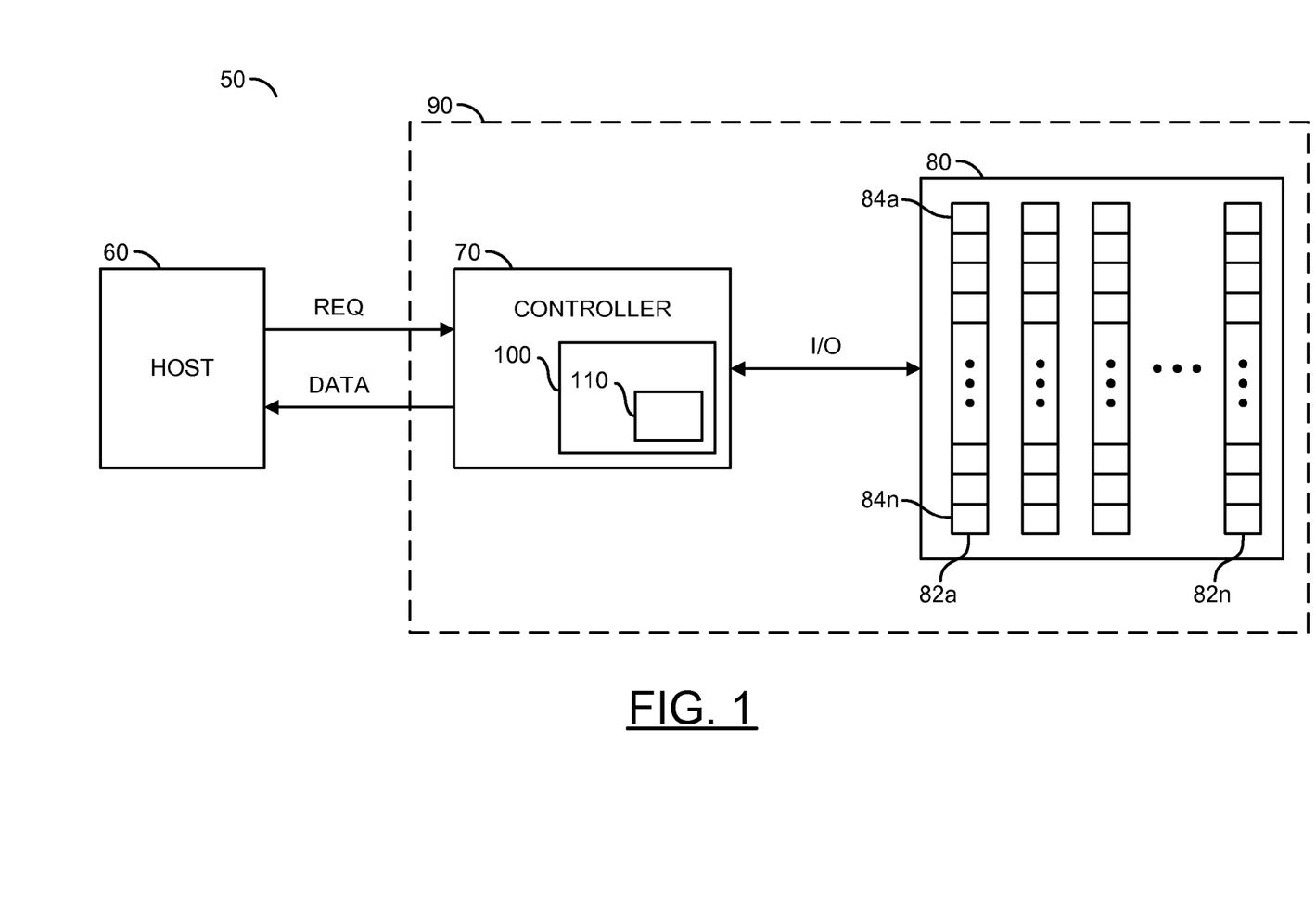
FIG. 1 is a diagram illustrating an example embodiment.

Referring to FIG. 1, a block diagram of an example apparatus 50 is shown. The apparatus 50 generally comprises a block (or circuit) 60, a block (or circuit) 70 and a block (or circuit) 80. The circuit 70 may include a circuit 100. The circuit 100 may be a memory/processor configured to store computer instructions (or firmware) or may be logic. The instructions, when executed, may perform a number of steps. The firmware 100 may include a redundancy control module 110. The redundancy control module 110 may be implemented as part of the firmware 100 or as a separate module. While an example of redundancy implemented in the firmware 100 is shown, the redundancy may be implemented, in another example, in hardware (e.g., logic such as a state machine).

A signal (e.g., REQ) may be generated by the circuit 60. The signal REQ may be received by the circuit 70. The signal REQ may be a request signal that may be used to access data from the circuit 80. A signal (e.g., I/O) may be generated by the circuit 70 to be presented to/from the circuit 80. The signal REQ may include one or more address bits. A signal (e.g., DATA) may be one or more data portions received by the circuit 60.

The circuit 60 is shown implemented as a host circuit. The circuit 70 reads and writes data to and from the circuit 80. The circuit 80 is generally implemented as a nonvolatile memory circuit. The circuit 80 may include a number of modules 82a-82n. The modules 82a-82n may be implemented as NAND flash chips. In some embodiments, the circuit 80 may be a NAND flash device. In other embodiments, the circuit 70 and/or the circuit. 80 may be implemented as all or a portion of a solid state drive 90 having one or more nonvolatile devices. The circuit 80 is generally operational to store data in a nonvolatile condition. When data is read from the circuit 80, the circuit 70 may access a set of data (e.g., multiple bits) identified in the signal REQ. The signal REQ may request data from the drive 90 or from one of a number of additional storage devices.

Data within the circuit 80 is generally organized in a hierarchy of units. A first type of redundancy may be implemented as a redundancy block. A redundancy block is a combination of blocks (e.g., a block from each nonvolatile memory die in the circuit 80) that can be combined to form a redundant array of silicon independent elements, similar to a redundant array of independent disks for magnetic media. The nonvolatile memory locations within the blocks may be written in a striped fashion. In some embodiments, organizing a plurality of blocks in redundancy blocks reduces an overhead of block management. A block is generally considered a smallest quantum of erasing. A page is generally considered a smallest quantum of writing. A read unit (or codeword or Epage or ECC-page) is a smallest correctable quantum of reading and/or error correction. Each block includes an integer number of pages. Each page includes an integer number of read units.

In some embodiments, the circuit 80 may be implemented as a single-level cell (e.g., SLC) type circuit. An SLC type circuit generally stores a single bit per memory cell (e.g., a logical 0 or 1). In other embodiments, the circuit 80 may be implemented as a multi-level cell (e.g., MLC) type circuit.

An MLC type circuit is generally capable of storing multiple (e.g., two) bits per memory cell (e.g., logical 00, 01, 10 or 11). In still other embodiments, the circuit 80 may implement a triple-level cell (e.g., TLC) type circuit. A TLC circuit may be able to store multiple (e.g., three) IS bits per memory cell (e.g., a logical 000, 001, 010, 011, 100, 101, 110 or 111).

The drive 90 may contain, in one example, multiple NAND Flash or memory modules 82a-82n. Each of the memory modules may be fabricated as one or more dies (e.g., 1, 2, 4, 8, etc.). The dies (or modules) 82a-82n may operate to read or to write concurrently.

The read and write bandwidth depends on how many of the dies 82a-82 n are implemented, as well as the bandwidth of each of the dies 82a-82n. Each of the dies 82a-82n may contain a plurality of pages 84a-84n. If the SSD drive 90 receives the host command REQ, in order to achieve the best performance, and/or to address wear leveling issues, the drive 90 will walk through all of the dies 82a-82n (e.g., a first page of DIE0, DIE1 DIEn, then a next page of DIE0).

Figure 2:
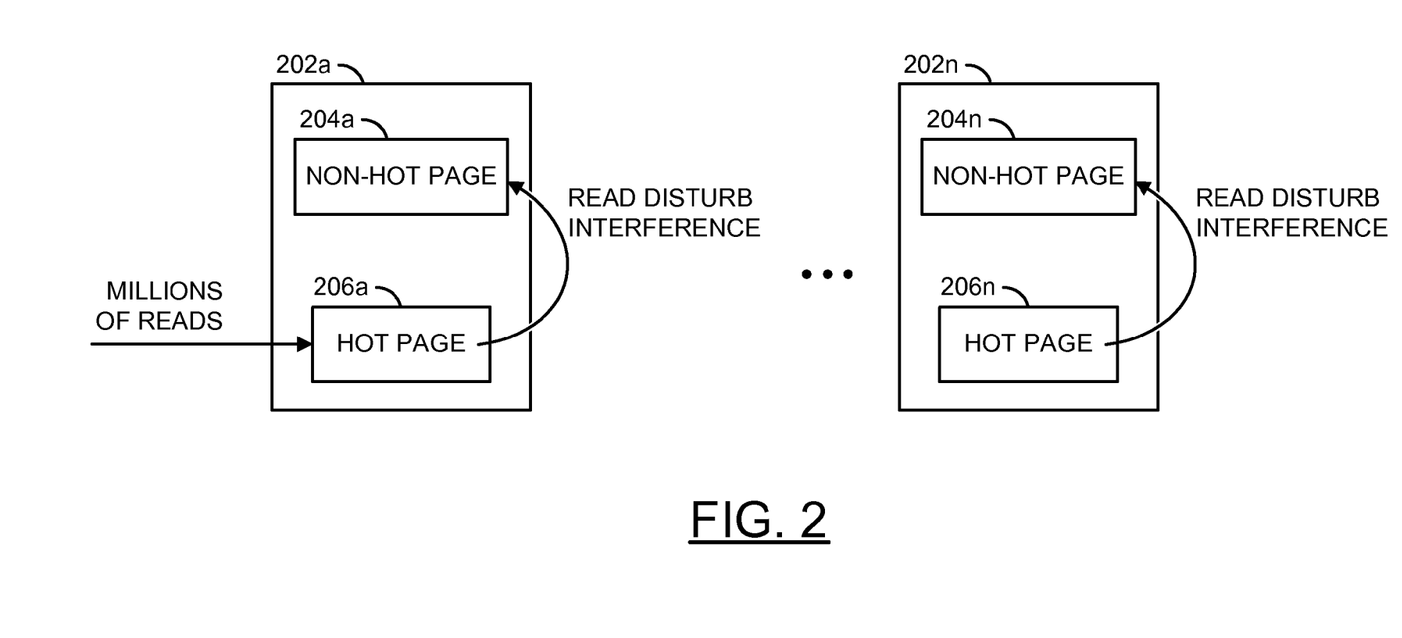
FIG. 2 is a diagram illustrating hot-read data pages causing read disturb interference on non hot-read data pages.

Referring to FIG. 2, a block diagram illustrating hot-read data pages causing read disturb interference on non hot-read data pages is shown. The memory modules 82a-82n generally comprise a number of blocks (or circuits) 202a-202n. The circuits 202a-202n may be memory blocks. The memory blocks 202a-202n are generally considered a smallest quantum of erasing in the memory modules 82a-82n. The memory blocks 202a-202n generally comprise a number of blocks (or circuits) 204a-204n, and blocks (or circuits) 206a-206n. The circuits 204a-204n may be non hot-read data pages. The circuits 206a-206n may be hot-read data pages.

In one embodiment, the hotness (e.g., how frequently data is accessed) of the data to be read may be tracked. Data stored in flash memory may be classified into hot-read data pages 206a-206n and non hot-read data pages 204a-204n. Hot-read data may be data that is read multiple times (e.g., thousands and/or millions of times). Generally, the hot-read data pages 206a-206n may be stored in the same memory blocks 202a-202n with other non hot-read data pages 204a-204n. Read operations may cause read disturb errors to accumulate on data in the same memory block (e.g., one of the memory blocks 202a-202n). The repeated reading on hot-read data pages 206a-206n may cause read disturb interference on the other non hot-read data pages 204a-204n that share the same memory blocks 202a-202n with the hot-read data pages 206a-206n. The accumulation of read disturb errors may cause frequent data recycling. Frequent data recycling may increase system cost. Read disturb interference from hot-read data may also cause read disturb amplification. For example, even if only one page in a block is hot-read data and the other pages (e.g., the other 511 pages) inside the same block are non hot-read data, the other 511 pages may be significantly disturbed and have to be recycled.

Figure 3:
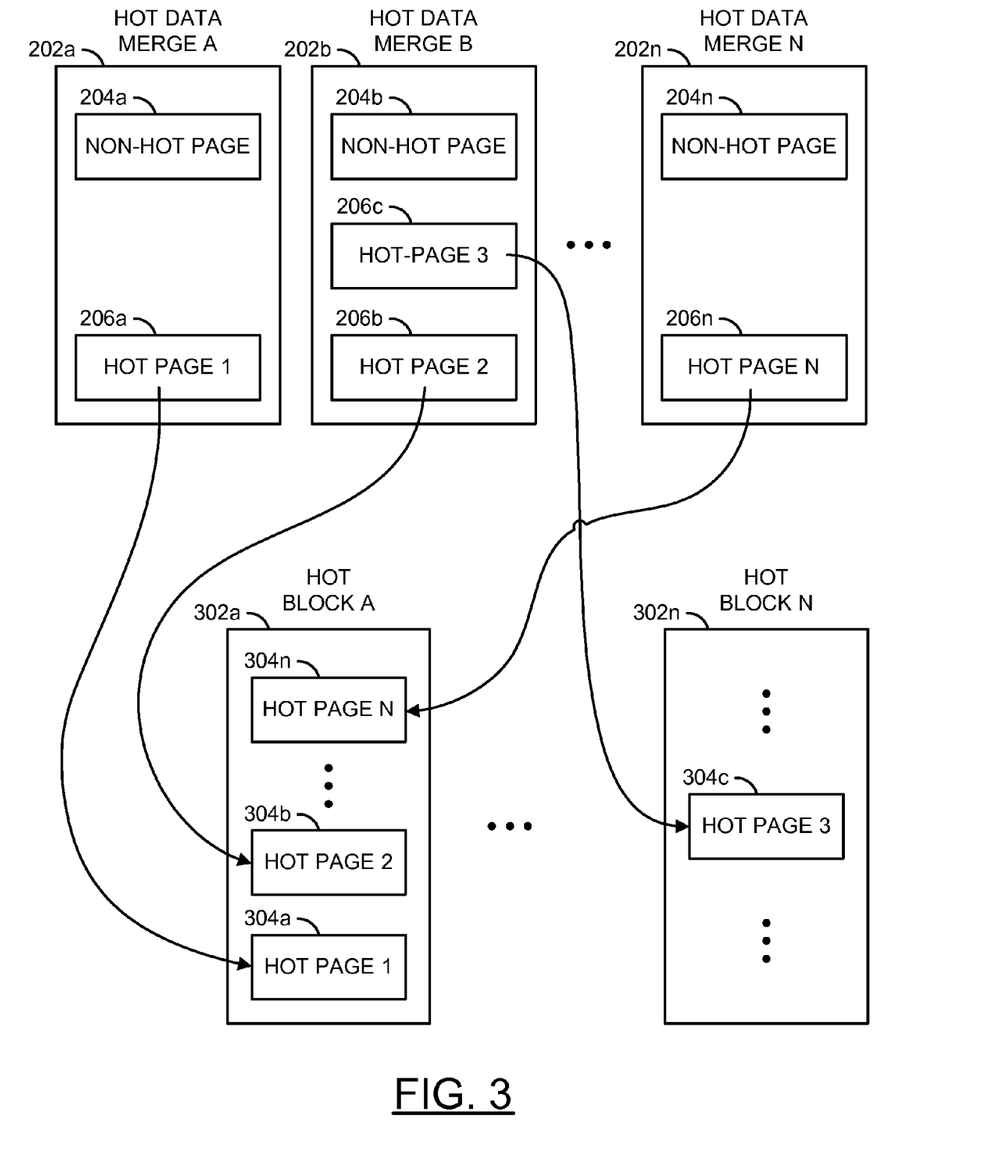
FIG. 3 is a diagram illustrating aggregation of hot-read data to dedicated hot blocks.

Referring to FIG. 3, a diagram illustrating aggregation of hot-read data to dedicated hot blocks 302a-302n is shown. The dedicated hot blocks 302a-302n may comprise blocks (or circuits) 304a-304n. The circuits 304a-304n may be aggregated hot-read data pages from the memory blocks 202a-202n. For example, the hot-read data page 304a in the dedicated hot block 302a may be the hot-read data page 206a from the memory block 202a. In another example, the hot-read data page 304b in the dedicated hot block 302a may be the hot-read data page 206b from the memory block 202b. In another example, the hot-read data page 304c in the dedicated hot block 302n may be the hot-read data page 206c from the memory block 202b. In another example, the hot-read data page 304n in the dedicated hot block 302a may be the hot-read data page 206n from the memory block 202n. The particular arrangement of the aggregated hot-read data pages 304a-304n in the dedicated hot blocks 302a-302n may be managed by the controller 70. The number of dedicated hot blocks 302a-302n may be varied to meet the design criteria of a particular implementation.

The hot-read data 206a-206n from multiple memory blocks 202a-202n may be merged to selected dedicated hot blocks 302a-302n. Generally, data in the selected dedicated hot blocks may store hot-read data. After merging the hot-read data 206a-206n to the dedicated hot blocks 302a-302n, the memory blocks 202a-202n may generally store non hot-read data pages. The non hot-read data pages 204a-204n may suffer from hot-read data disturbs less often. The aggregated hot-read data pages 304a-304n may only disturb other hot-read data pages 304a-304n in the same dedicated hot blocks 302a-302n. The hot-read data pages 206a-206n from the distributed memory blocks 202a-202n may be merged to the dedicated hot blocks 302a-302n so that the read disturb interference that would have been caused due to multiple reads on the hot-read data pages 206a-206 n to the other non hot-read data pages 204a-204n stored on the same memory block may be mitigated. The large number of data recycles caused by a relatively small number of hot-read data may be mitigated.

Figure 4:
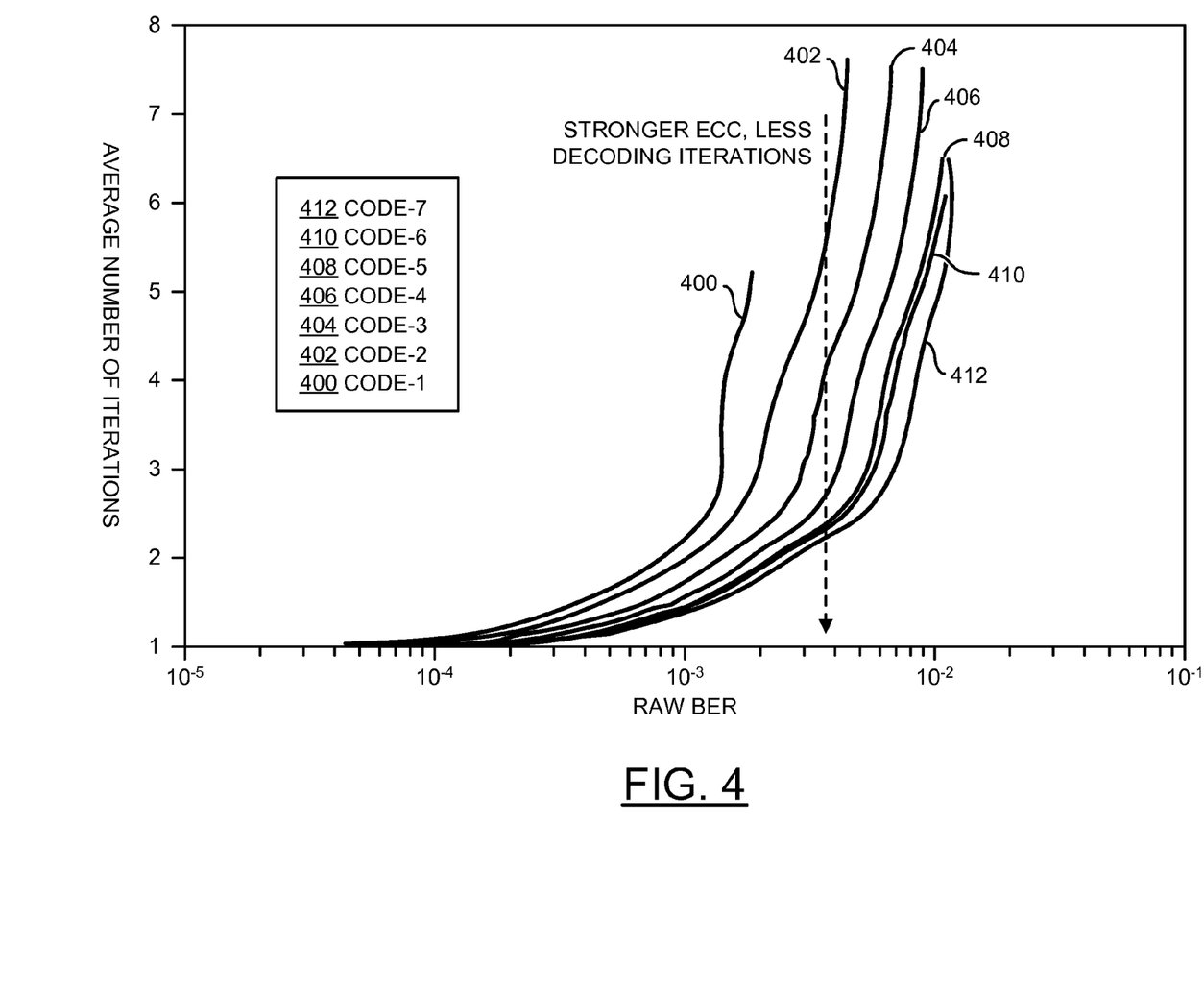
FIG. 4 is a graph comparing various error correcting code (ECC) methods.

Referring to FIG. 4, a graph comparing various error correcting code (ECC) types are shown. The x axis may represent the raw bit error rate (BER). The y axis may represent the average number of iterations needed by a particular ECC type. The lines 400-412 may represent various ECC types. Generally, an ECC type on the right may be stronger than an ECC type on the left. For example, the ECC type 412 may be stronger than the ECC type 410, the ECC type 410 may be stronger than the ECC type 408, the ECC type 408 may be stronger than the ECC type 406, the ECC type 406 may be stronger than the ECC type 404, the ECC type 404 may be stronger than the ECC type 402, and the ECC type 402 may be stronger than the ECC type 400. The weakest ECC type may be an ECC type with a high coding rate (e.g., fewer parity bits to protect the user data). The strongest ECC type may be an ECC type with a lower coding rate. (e.g., more parity bits to protect the user data). In one example, the ECC type may provide iterative decoding ECC, such as low-density parity-check (LDPC) codes. A stronger ECC type may have more parity bits to protect user data. The decoding process of a stronger ECC type may converge much faster than a weaker ECC type. A stronger ECC type may have more information for decoding, resulting in fewer iterations for successful decoding. The flash controller 70 may implement multiple ECC types.

The flash controller 70 may select different ECC types based on the design criteria of a particular implementation. Stronger ECC may correct more errors with fewer iterations. Fewer iterations may result in reduced decoding latency. The flash controller 70 may select a stronger ECC to protect the aggregated hot-read data pages 304a-304n stored on the dedicated hot-blocks 302a-302n. The read latency may be reduced for the hot-read data pages 304a-304n. Data recycling due to read disturb may be less frequent.

Stronger ECCs may have larger error correction capability than weaker ECCs. Stronger ECCs may decode data that suffers from read disturbs resulting in less data recycling. Stronger ECCs may need fewer iterations to decode data, resulting in less decoding latency. Since hot-read data is read multiple times (e.g., thousands or millions of times) even a small savings in reading and/or decoding time may result in a significant improvement to, overall performance of the solid state drive 90. The reduced decoding latency resulting from selecting a stronger ECC to protect hot-read data may result in a significant improvement to the overall performance of the solid state drive 90.

Figure 5:
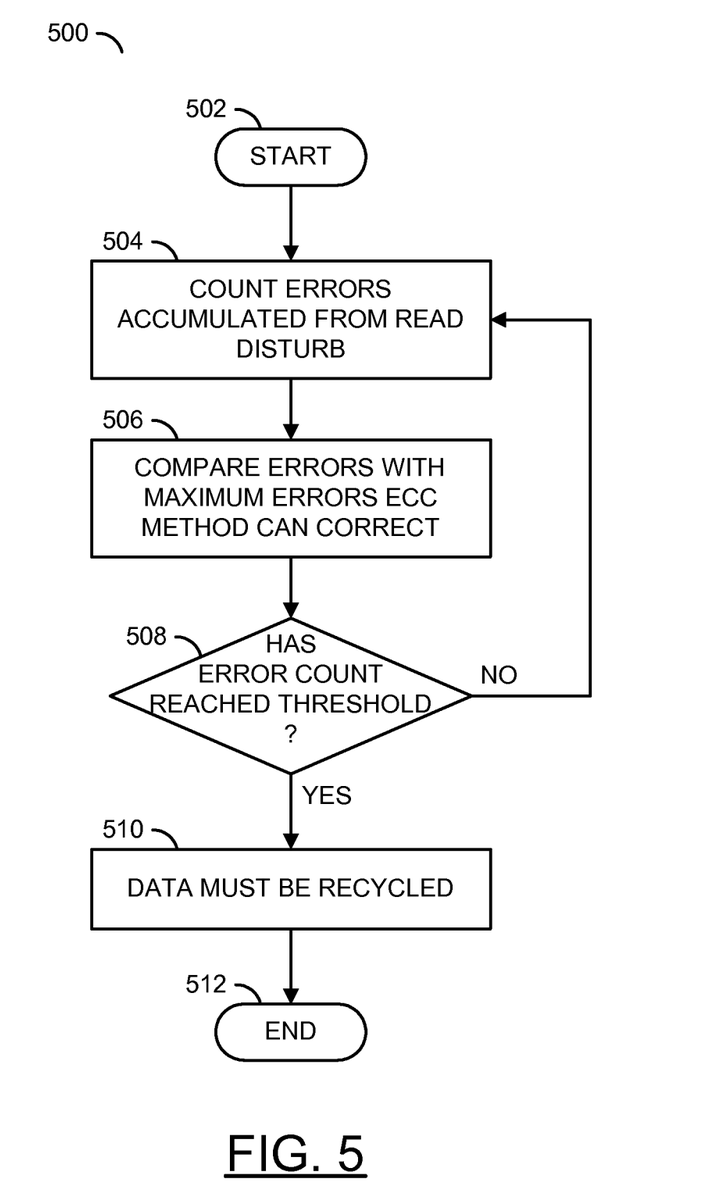
FIG. 5 is a flow diagram illustrating data recycling.

Referring to FIG. 5, a flow diagram illustrating a method (or process) 500 is shown. The method 500 may illustrate data recycling in the solid state drive 90. The method 500 generally comprises a step (or state) 502, a step (or state) 504, a step (or state) 506, a decision step (or state) 508, a step (or state) 510, and a step (or state) 512. The state 502 may start the method 500. The state 504 may count errors accumulated from read disturb. The state 506 compares the errors accumulated from read disturb with the maximum errors the ECC method can correct. Next, the decision state 508 may determine whether the error count has reached a threshold value. If not, the method 500 moves to the state 504. If so, the method 500 moves to the state 510. Next, the state 510 must recycle data. Data may need to be recycled because it has accumulated too many errors for the ECC to correct. The state 512 may end the method 500.

Flash memory suffers from read disturb. Memory cells that store hot-read data tend to cause read disturb errors in other cells that share the same memory block. When the accumulated read disturb errors are larger than a certain threshold value, the stored data may have uncorrectable errors. The threshold may be defined as:

$$k \times (\text{Maximum number of errors that ECC can correct})$$

where, k is between 0 and 1.

Generally, the hot-read data is recycled before the error count reaches the threshold value. If the ECC is capable of correcting more errors, the tolerable number of reads may be increased. If the tolerable number of reads is increased, data recycling due to read-disturb errors may be less frequent.

The flash controller 70 may implement multiple ECCs. Some ECCs may be weaker and some ECCs may be stronger. Weak ECCs may correct fewer errors. Strong ECCs may correct more errors. Generally, weaker ECCs are used when program-erase (P/E) cycles are low. Generally, stronger ECCs are used when P/E cycles are high.

Due to a higher error correction capability of strong ECCs, stronger ECC may need fewer iterations to correct errors. Given the same BER, stronger ECCs may need fewer iterations to decode data. The read performance of stronger ECCs may be better than the read performance of weaker ECCs.

The multiple ECCs in the flash controller 70 may be leveraged for encoding hot-read data. Stronger ECCs may be used to protect the hot-read data. Stronger ECCs may tolerate a greater number of repeated read operations reducing the amount of data recycling needed due to read disturb errors. The performance impact on the solid state drive 90 due to data recycling may be reduced.

Figure 6:
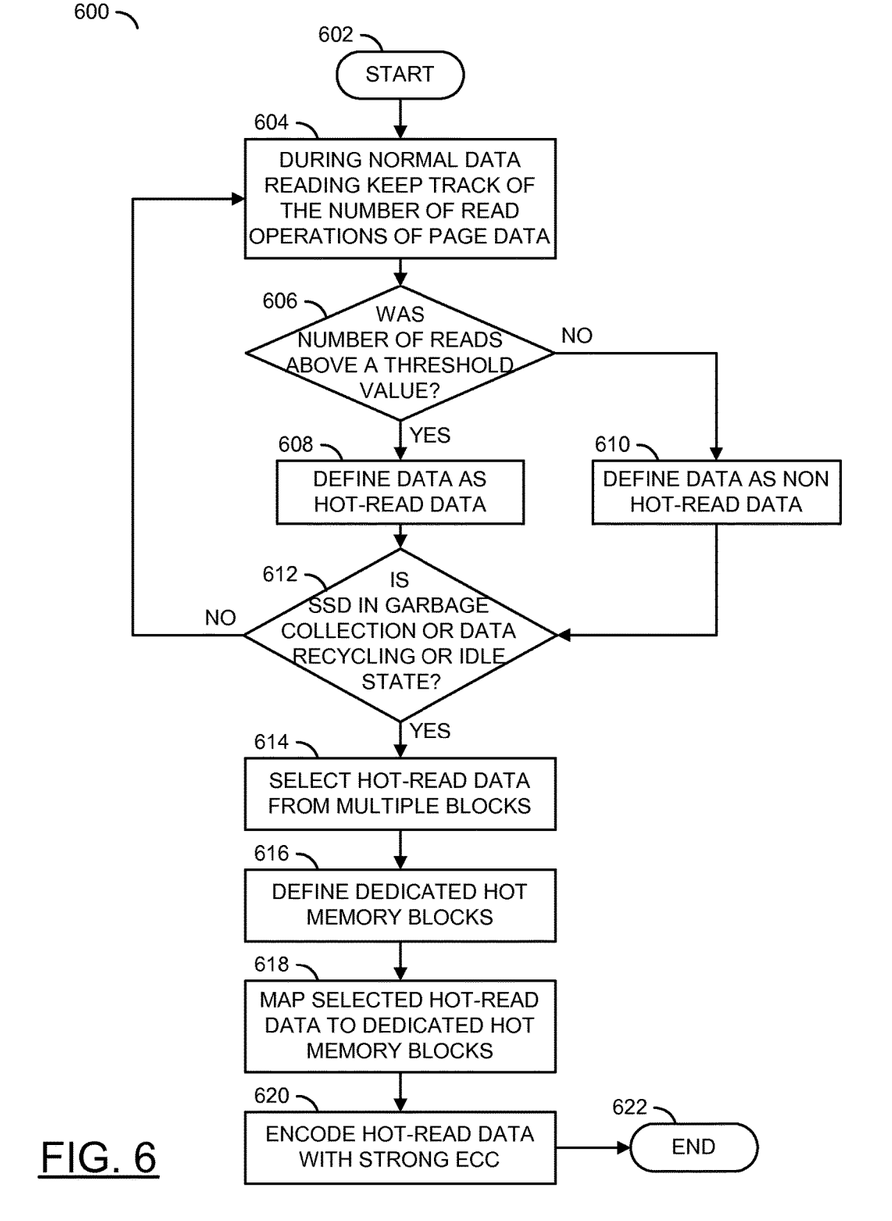
FIG. 6 is a flow diagram illustrating aggregation of hot-read data to dedicated hot blocks.

Referring to FIG. 6, a flow diagram illustrating a method (or process) 600 is shown. The method 600 may illustrate aggregation of hot-read data to the dedicated hot blocks 302*a*-302*n*. The method 600 generally comprises a step (or state) 602, a step (or state) 604, a decision step (or state) 606, a step (or state) 608, a step (or state) 610, a decision step (or state) 612, a step (or state) 614, a step (or state) 616, a step (or state) 618, a step (or state) 620, and a step (or state) 622. The state 602 may start the method 600. The state 604 may keep track of the number of read operations of page data (e.g., data stored in the pages 84*a*-84*n*) during normal data reading. Next, the method 600 may move to the decision state 606. The decision state 606 may determine whether the number of reads is above a threshold value. If not, the state 610 may define the data as non hot-read data. Next, the method 600 may move to the state 612. In the decision state 606, if the method 600 determines the number of reads is above a threshold value, the method 600 moves to the state 608. The state 608 may define the data as hot-read data. Next, the decision state 612 may determine if the solid state drive 90 is in a garbage collection, data recycling state, and/or idle state. If not, the method 600 may move to the state 604. If so, the method 600 may move to the state 614. The state 614 may select hot-read data (e.g., the hot-read data pages 206*a*-206*n*) from multiple memory blocks (e.g., the memory blocks 202*a*-202*n*). Next, the state 616 may define dedicated hot memory blocks 302*a*-302*n*. The state 618 may map the selected hot-read data 206*a*-206*n* to the dedicated hot memory blocks 302*a*-302*n*. Next, the state 620 may encode the aggregated hot-read data 304*a*-304*n* in the dedicated hot memory blocks 302*a*-302*n* with strong ECC. Next, the state 622 may end the method 600.

Generally, aggregation of the hot-read data pages 206*a*-206*n* to the dedicated hot blocks 302*a*-302*n* may be applied during garbage collection, data recycling and/or an idle state. Performing aggregation during garbage collection, data recycling, and/or an idle state may reduce a performance impact on the solid state drive 90. Hot-read data may be identified based on history access records. The distributed hot-read data 206*a*-206*n* in the different memory blocks 202*a*-202*n* may be aggregated into dedicated hot blocks 302*a*-302*n*. The aggregated hot-read data pages 304*a*-304*n* in the dedicated hot blocks 302*a*-302*n* may be protected with strong ECC for high reading throughput and/or read disturb correction. The frequency of data recycling due to read disturb may be mitigated.

Data that is frequently read may be called hot-read data. Data that is not read frequently may be called non hot-read data and/or cold-read data. System performance of hot-read data is determined by the read speed. Data is often programmed once but read millions of times. Due to the large number of read operations, a small improvement in read latency may significantly improve system performance of the solid state drive 90.

The hotness of hot-read data may be predictable. When data is written by applications, operating systems, and/or file systems, the application/OS/file system may have prior knowledge of whether the data is hot-read data or non hot-read data. If the application/OS/file system is not aware of the prior knowledge of the hotness of the read data, the flash controller 70 may track the data hotness. The flash controller. 70 may track the number of reads of particular data. By counting the number and/or history of reads, the hotness of data may be predicted.

Generally, data stored on the solid state drive 90 will be recycled either due to garbage collection, wear leveling and/or retention triggered data recycles. When the already stored data needs to be migrated to other blocks, the read history may be used to determine whether the data is hot or not. The hot-read data may be mapped to a particular address.

Generally, the hot-read data 206*a*-206*n* may be distributed among multiple memory blocks 202*a*-202*n*. Reading the hot-read data 206*a*-206*n* may disturb other data, including the non hot-read data pages 204*a*-204*n*. For example, if one of the memory blocks 202*a*-202*n* comprises 512 data pages, one page of hot-read data may disturb the 511 pages of other data in the memory block. By mapping the target address of the hot-read data pages 206a-206n in the memory blocks 202a-202n to the aggregated hot-read data pages 304a-304n in the dedicated hot blocks 302a-302n, the effect of hot-read data on non hot-read data may be reduced. The aggregation of hot-read data to the dedicated memory blocks 302a-302n may be performed by the controller 70 during garbage collection, data recycling and/or an idle state. Performing aggregation during garbage collection, data recycling, and/or an idle state may reduce a performance impact on the solid state drive 90. For example, the read operations for the hot-data pages may be performed on the dedicated hot blocks 302a-302n instead of the memory blocks 202a-202 n. The non hot-read data pages 204a-204n may not suffer from read disturbs from the aggregated hot-read data pages 304a-304n. The aggregated hot-read data pages 304a-304n may be encoded with stronger ECC to improve read performance, tolerate a higher raw BER, and/or tolerate a greater number of read disturbs. Read performance of the solid state drive 90 may be improved.

The functions performed by the diagrams of FIGS. 5 and 6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a memory configured to store data, the memory comprising a plurality of memory modules each having a size less than a total size of the memory; and
   a controller configured to process a plurality of read/write operations, classify data pages from multiple blocks of the memory as hot-read data or non hot-read data, select a strong type of error correcting code for the hot-read data, reducing a frequency of data recycling of the hot-read data based upon an error correcting capability of the strong type of error correcting code selected, and aggregate the hot-read data by
      determining whether the apparatus is in a garbage collection state, a data recycling state, or an idle state, and if so,
      selecting the hot-read data pages from multiple memory blocks, and
      mapping the selected hot-read data pages from the multiple memory blocks to dedicated hot-read data blocks using the strong type of error correcting code,
   wherein the aggregation of the hot-read data pages and use of the strong type of error correcting code reduces read latency of the hot-read data pages, reduces the frequency of data recycling of the hot-read data pages, and reduces an impact of read disturbs on endurance of the memory.

2. The apparatus according to claim 1, wherein the aggregation of the hot-read data using the strong type of error correcting code reduces read disturb amplification.

3. The apparatus according to claim 1, wherein the controller selects one of a plurality of types of error correcting codes.

4. The apparatus according to claim 3, wherein the strong type of error correcting code has larger error correction capability, needs fewer iterations to decode the data, has less decoding time, tolerates high raw bit error rates, and decodes data that suffers from read disturbs.

5. The apparatus according to claim 1, wherein the classification of the data is based on a history of access records.

6. The apparatus according to claim 5, wherein:
in a first mode, the history of access records are tracked by at least one of an application, an operating system, and a file system; and
in a second mode, the history of access records are tracked by the controller.

7. The apparatus according to claim 1, wherein the aggregation is implemented when the controller is implementing the garbage collection operation.

8. The apparatus according to claim 1, wherein the aggregation is implemented when the controller is implementing the data recycling state.

9. The apparatus according to claim 1, wherein the aggregation is implemented when the controller is implementing the idle state.

10. The apparatus according to claim 1, wherein the classification of the hot-read data is implemented by:
tracking a number of read operations on the memory during data reading operations; and
determining if the number of read operations is above a threshold value.

11. The apparatus according to claim 10, wherein the data is classified as hot-read data when the number of read operations is above the threshold value and classified as non-hot data when the number of read operations is not above the threshold value.

12. A method for controlling a solid state drive, comprising the steps of:
configuring a controller to process a plurality of read/write operations using memory comprising a plurality of memory modules each having a size less than a total size of the memory;
classifying data pages from multiple blocks of the memory as hot-read data or non hot-read data;
selecting a strong type of error correcting code for the hot-read data, reducing a frequency of data recycling of the hot-read data based upon an error correcting capability of the strong type of error correcting code selected; and
aggregating the hot-read data by
determining whether the solid state drive is in a garbage collection state, a data recycling state, or an idle state, and if so,
selecting the hot-read data pages from multiple memory blocks, and
mapping the hot-read data pages from the multiple blocks to dedicated hot-read data blocks using the strong type of error correcting code,
wherein aggregating the hot-read data pages in the dedicated hot-read data blocks and using the strong type of error correcting code reduces read latency of the hot-read data pages, reduces the frequency of data recycling of the hot-read data pages, and reduces an impact of read disturb on endurance of the memory.

13. The apparatus according to claim 1, wherein the hot-read data is recycled when a number of errors in the hot-read data exceeds a number of errors the strong type of error correcting code is capable of correcting.

14. An apparatus comprising:
an interface configured to process a plurality of read/write operations to/from a memory, the memory comprising a plurality of memory modules each having a size less than a total size of the memory; and
a control circuit configured to classify data pages from multiple blocks of the memory as hot-read data or non hot-read data, select a strong type of error correcting code for the hot-read data, reducing a frequency of data recycling of the hot-read data based upon an error correcting capability of the strong type of error correcting code selected, and aggregate the hot-read data by
determining whether the apparatus is in a garbage collection state, a data recycling state, or an idle state, and if so,
selecting the hot-read data pages from multiple memory blocks, and
mapping the selected hot-read data pages to dedicated hot-read data blocks using the strong type of error correcting code,
wherein the aggregation of the hot-read data pages and use of the strong type of error correcting code reduces read latency of the hot-read data pages, reduces the frequency of data recycling of the hot-read data pages, and reduces an impact of read disturb on endurance of the memory.

15. The apparatus according to claim 1, wherein the strong type of error correcting code used for the dedicated blocks has more parity bits than an error correcting code selected for the non hot-read data.

16. The apparatus according to claim 1, wherein an impact on the endurance of the memory due to data recycling in response to accumulated read disturbs and read disturb amplification is reduced.

17. The apparatus according to claim 1, wherein the memory and the controller are part of a solid state drive.

18. The apparatus according to claim 1, wherein the strong type of error correcting code is configured to tolerate a greater number of repeated read operations in order to reduce an amount of data recycling due to read disturb errors.

19. The apparatus according to claim 1, wherein the hot-read data is read frequently compared to programming the hot-read data.

20. The apparatus according to claim 1, wherein the strong type of error correcting code is configured to protect the hot-read data in the dedicated blocks.

* * * * *